(12) United States Patent
Lewis et al.

(10) Patent No.: US 10,235,454 B1
(45) Date of Patent: Mar. 19, 2019

(54) GENERATING PLAYLIST INCLUSIVE CANONICAL NETWORK ADDRESSES

(71) Applicant: Google Inc., Mountain View, CA (US)

(72) Inventors: Justin Lewis, Marina del Rey, CA (US); Gavin James, Los Angeles, CA (US)

(73) Assignee: Google LLC, Mountain View, CA (US)

(*) Notice: Subject to any disclaimer, the term of this patent is extended or adjusted under 35 U.S.C. 154(b) by 551 days.

(21) Appl. No.: 14/242,811

(22) Filed: Apr. 1, 2014

(51) Int. Cl.
*G06F 17/30* (2006.01)

(52) U.S. Cl.
CPC .... *G06F 17/3071* (2013.01); *G06F 17/30864* (2013.01)

(58) Field of Classification Search
CPC ........... G06F 17/30772; G06F 17/3071; G06F 17/30864
USPC .......................... 707/737, 756, 803, 736, 791
See application file for complete search history.

(56) References Cited

U.S. PATENT DOCUMENTS

| | | | | |
|---|---|---|---|---|
| 7,627,613 B1* | 12/2009 | Dulitz | ............... | G06F 17/30864 |
| 8,892,541 B2* | 11/2014 | Ghosh | ............... | G06F 17/30696 |
| | | | | 707/706 |
| 9,002,879 B2* | 4/2015 | Spiegelman | ...... | G06F 17/30766 |
| | | | | 707/769 |
| 2003/0009452 A1* | 1/2003 | O'Rourke | ......... | G06F 17/30053 |
| 2014/0201147 A1* | 7/2014 | Wadycki | ............ | G06Q 30/0217 |
| | | | | 707/637 |
| 2015/0193192 A1* | 7/2015 | Kidron | .................... | G06F 3/165 |
| | | | | 700/94 |

OTHER PUBLICATIONS

Wikipedia, "Playlist" Last Modified on Aug. 23, 2014, 4 Pages, [online] [Retrieved on Oct. 15, 2014] Retrieved from the internet <URL:http://en.wikipedia.org/wiki/Playlist>.
Grooveshark, "Grooveshark Widgets—Now Available within Grooveshark," Escape Media Group, 2011, 2 Pages, [online] [Retrieved on Oct. 15, 2014] Retrieved from the internet <URL:http://widgets.grooveshark.com/>.

* cited by examiner

*Primary Examiner* — Marcin R Filipczyk
(74) *Attorney, Agent, or Firm* — Lowenstein Sandler LLP (57) ABSTRACT

A content server stores digital content including video, audio, image, animation, or text content. The content server receives requests to access digital content at a URI, which includes a content identifier specifying a digital content item and, optionally, a playlist identifier specifying a playlist containing the digital content item. The content server obtains a canonical playlist that uniquely contains the specified digital content item out of all canonical playlists and generates a canonical URI containing a canonical playlist identifier and the digital content item identifier. The content server incorporates this canonical URI into metadata associated with the digital content. When the digital content is presented through a content distributor, the associated metadata indicates the canonical playlist and optionally a next digital content item from the canonical playlist. Additionally, the content server may associate no-index metadata with digital content in non-canonical playlists to remove the digital content from search results.

18 Claims, 7 Drawing Sheets

GENERATING PLAYLIST INCLUSIVE CANONICAL NETWORK ADDRESSES

BACKGROUND

1. Field of Art

The disclosure generally relates to the field of distributing digital content such as video, audio, images, animations, or text, and in particular, to organizing digital content in playlists to direct user navigation through digital content.

2. Description of the Related Art

A content server allows users to upload digital content such as videos, audio, images, and/or animations. Other users may view the digital content using a client device to browse digital content hosted on the content server. On some content servers, users may organize digital content into playlists (in the case of video and audio) and albums (in the case of images and animations). For example, a playlist typically specifies a number of videos and an order to watch those videos. Playlists and videos are not coextensive in that multiple playlists may identify the same video.

In particular, a user may place a video into a playlist of unrelated videos, which creates engagement problems when users watching a video episode in this playlist have difficulty finding the next video episode in the series. Additionally, playlists of videos uploaded by other users may create revenue problems for video uploaders who earn money when viewing users watch their videos. For example, a playlist creator makes a playlist that intersperses the playlist creator's videos with popular videos uploaded by other users. These popular videos draw viewing users into the example playlist and away from watching the popular videos in their original playlist. Once users are watching in the example playlist, their next videos are from the playlist creator instead of the original uploaders of the popular videos. The net effect is to divert revenue from uploaders of popular content because the example playlist diverts views for the playlist creator's videos.

SUMMARY

A content server stores digital content including video, audio, image, animation, or text content, which users of the content server may upload. Users of the content server may organize digital content into playlists (or albums or other appropriate groupings of digital content). To better organize digital content, the content server may designate a playlist created by a user as a canonical playlist with respect to digital content in the playlist that the user uploaded. Alternatively or additionally, a user may select a playlist as a canonical playlist for digital content the user has uploaded. A canonical playlist may identify various digital content items, but a digital content item may belong only to a single canonical playlist.

To obtain digital content, a client device, content distributor, or search engine accesses digital content at a URI (uniform resource identifier) such as a URL (uniform resource locator) indicating a content identifier and, optionally, a playlist identifier. In one embodiment, the content server determines whether the content identifier corresponds to content in a playlist corresponding to the playlist identifier. If the content does not match the playlist, the content server ignores the playlist identifier; in other words, the content server treats the request to access content as if the request did not include a playlist identifier in the URI.

If the URI includes a valid playlist-content combination, the content server determines whether the playlist is the canonical playlist for the content. If the playlist is not the canonical playlist, the content server obtains the canonical playlist identifier for the content if the content has a canonical playlist. The content server generates a canonical URI for the content in the playlist including the content identifier and, if the content has a canonical playlist, the canonical playlist identifier.

If the URI does not include a playlist identifier or the identified playlist does not match the identified content, the content server determines whether the content has a canonical playlist. If the content has a canonical playlist, the content server obtains the canonical playlist identifier and generates a canonical URI including the content identifier and the canonical playlist identifier. If the content does not have a canonical playlist, the content server generates a canonical URI for the content with the content identifier.

The generated canonical URI is incorporated in metadata associated with the digital content. A content player embedded in a website or application may use the canonical playlist incorporated in metadata to suggest a next content item to the user or to automatically retrieve a next content item as part of an auto-play experience. Additionally, the content server may request that search engines de-index instances of digital content belonging to a canonical playlist when the digital content is present in a non-canonical playlist. To do this, the content server incorporates metadata indicating to search engines not to index the digital content in the non-canonical playlist. In an alternative embodiment, the content server redirects requests to access content in a non-canonical playlist (or requests to access content without a playlist) to the canonical URI for the content. In other words, the alternative embodiment directs requesting users to experience requested content through the canonical playlist if one exists for the content.

The disclosed embodiments include a computer-implemented method, a system, and a non-transitory computer-readable medium. The features and advantages described in this summary and the following description are not all inclusive and, in particular, many additional features and advantages will be apparent in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description and the accompanying figures (or drawings). A brief introduction of the figures is below.

DETAILED DESCRIPTION

The Figures and the following description relate to particular embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

System Architecture

Figure 1:
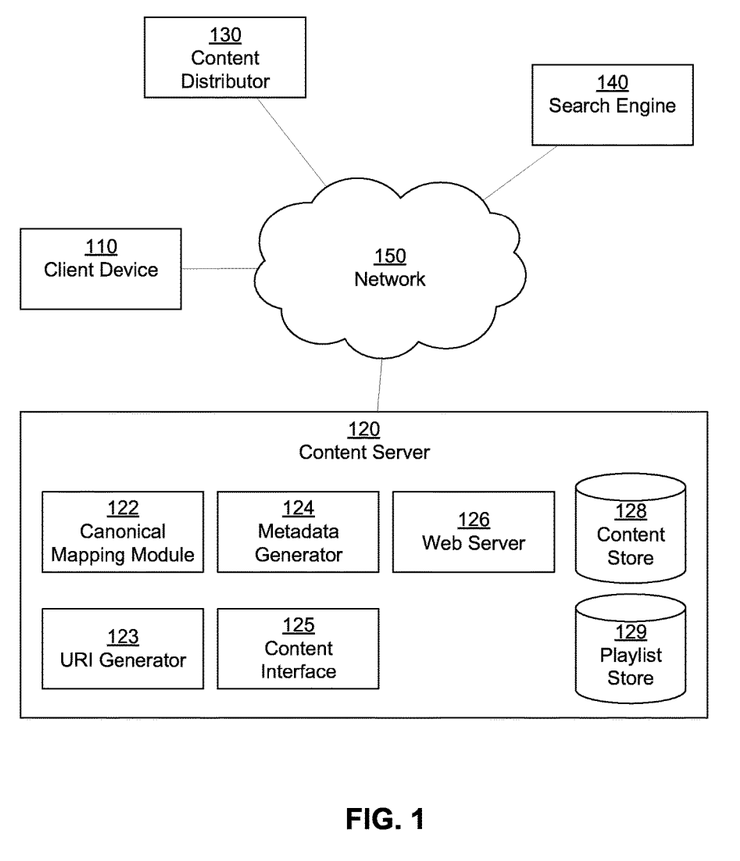
FIG. 1 illustrates a block diagram of a networked environment for sharing digital content, in accordance with one embodiment.

FIG. 1 illustrates a block diagram of a networked environment for sharing digital content, in accordance with one embodiment. The entities of the networked environment include a client device 110, a content server 120, a content distributor 130, a search engine 140, and a network 150. Although single instances of the entities are illustrated, multiple instances may be present. For example, multiple client devices 110 associated with multiple users may upload digital content, create playlists of digital content, and present digital content. The functionalities of the entities may be distributed among multiple instances. For example, a content distribution network of servers at geographically dispersed locations implements the content server 120 to increase server responsiveness and to reduce digital content loading times.

The client device 110 accesses digital content through the network 150 and presents digital content to a user. Presenting digital content includes playing a video or audio file as well as displaying an image or animation. In one embodiment, the client device 110 is a computer, which is described further below with respect to FIG. 6. Example client devices 110 include a desktop, a laptop, a tablet, a mobile device, a smart television, and a wearable device. Using the client device 110, a user may upload and manage digital content on the content server 120, which includes creating and modifying playlists of digital content. The client device 110 may contain software such as a web browser or other application for viewing digital content from the content server 120 or through the content distributor 130. The client device 110 may include software such a video player, an audio player, or an animation player to support presentation of embedded digital content. Similarly, the user may access the search engine 140 though an interface presented on the client device 110.

The content distributor 130 incorporates digital content from the content server into an interface. For example, the content distributor 130 creates webpages with an embedded video player with pointers to digital content on the content server 120. When a client device 110 accesses the external website 130, the client device 110 retrieves the digital content from the content server 120 using the pointer. Alternatively or additionally, a native application on the client device 110 presents digital content on the content server 120 or contains pointers thereto.

Besides websites or applications, the content distributor 130 may be another entity that incorporates digital content stored on the content server 120 such as a social network or a publish-subscribe system. For example, the content distributor 130 in one embodiment is a social network that generates a personalized content feed (or stream) for a requesting user of the client device 110. As another example, the content distributor 130 is a publish-subscribe system that transmits published content to subscribing users. The published content includes pointers to digital content, which the client device 110 uses to retrieve the digital content for the subscribing user from the content server 120.

Besides a content distributor 130, users may access content on the content server 120 through a search engine 140. In one embodiment, the search engine 140 crawls through digital content on the content server 120 to create an index listing the digital content. To index the content server, the search engine 140 may traverse a site map and index digital content based on associated metadata. When a user submits a search query, the search engine 140 ranks the indexed content based on relevance to the search query. Using the ranking, the search engine creates a search results interface that lists relevant digital content. If the search engine 140 indexes webpages or other content servers, then the search interface may include digital content from the content server 120 among other results.

The network 150 enables communications among the entities connected to them through one or more local-area networks and/or wide-area networks. In one embodiment, the network 150 is the Internet and uses standard wired and/or wireless communications technologies and/or protocols. The network 150 can include links using technologies such as Ethernet, 802.11, worldwide interoperability for microwave access (WiMAX), long term evolution (LTE), 3G, 4G, digital subscriber line (DSL), asynchronous transfer mode (ATM), InfiniBand, and/or PCI Express Advanced Switching. Similarly, the networking protocols used on the networks 170, 160 can include multiprotocol label switching (MPLS), transmission control protocol/Internet protocol (TCP/IP), User Datagram Protocol (UDP), hypertext transport protocol (HTTP), simple mail transfer protocol (SMTP), and/or file transfer protocol (FTP).

The data exchanged over the network 150 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above.

Content Server

The content server 120 stores digital content uploaded by users of client devices 110 and serves this digital content to viewing users of client devices 110. The content server 120 may also acquire digital content from content owners (e.g., production companies, record labels, publishers). In one embodiment, the content server 120 includes a canonical mapping module 122, a universal resource identifier (URI) generator 123, a metadata generator 124, a content interface 125, a web server 126, a content store 128, and a playlist store 129. The functionality of the illustrated components may be duplicated or redistributed among a different configuration of modules. Some described functionality may be optional; for example, in one embodiment the content server 120 does not provide a content interface 125.

The content server 120 stores uploaded digital content in the content store 128. The content store 128 may include the digital content itself (e.g., the audio or video file) or a pointer thereto. The content store 128 also houses metadata associated with the digital content. Metadata are properties of the digital content that indicate the digital content's source (e.g., an uploader name, an uploader user identifier) and/or attributes (e.g., a video identifier, a title, a description, a file size, a file type, a frame rate, a resolution, an upload date).

In addition to uploading digital content, users may create or modify playlists of digital content. The playlist store 129 stores playlists identifying one or more items of digital content as well as an ordering of the digital content. For example, a user may create a playlist of skydiving videos. After presenting a first skydiving video from the playlist, the client device 110 may automatically load a next skydiving video in a playlist, as indicated by the playlist's ordering.

In one embodiment, a user may create playlists out of content uploaded by other users, so digital content may be in more than one playlist. Similarly, users may add content they uploaded to multiple playlists (e.g., a workout music playlist and a "pump-up" playlist). In contrast to these non-canonical playlists, digital content may be part of a single canonical playlist chosen by the user who uploaded the digital content. For example, an uploader of a soap opera video series may place these videos in a canonical playlist that includes an ordering of videos, so users may easily access successive videos in the soap opera series. If an uploading user of digital content places the digital content in multiple playlists, the content server 120 may select one of the playlists created by the uploading user as the canonical playlist. For example, the content server 120 uses the oldest playlist containing digital content as that content's canonical playlist, or the content server 120 includes functionality for an uploading user to select a canonical playlist for digital content. If a playlist identifies digital content that specifies that playlist as its canonical playlist, then the playlist is the canonical playlist with respect to that digital content. A playlist may be canonical with respect to some digital content items (uploaded by the creator of the playlist) and non-canonical with respect to other included digital content items (uploaded by other users). In one embodiment, some playlists are ineligible to be canonical playlists, including un-shareable playlists (e.g., temporary playlists). Non-public playlists (e.g., private and unlisted playlists as specified by a user) may be canonical if the implementation maintains their non-public status.

The client device 110 requests digital content by accessing a URI (typically a URL) corresponding to the digital content. In one embodiment, the URI includes a domain associated with the content server 120 and a content identifier as well as an optional playlist identifier. Based on the content identifier and the playlist identifier, the content interface 125 presents the digital content corresponding to the content identifier in the playlist corresponding to the playlist identifier. The canonical mapping module 122 may handle conflicts that occur if the identified video does not belong to the identified playlist, or if no playlist is identified.

The content interface 125 may include a video or audio player or an image slideshow viewer, for example. Although one embodiment of the content server uses URLs, the content server 120 may alternatively or additionally use other URIs such as URNs, or some other form of pointer or address.

Presenting the content may also include retrieving and displaying metadata of the digital content from the content store 128 such as a title, upload data, and an uploader user identifier. Additionally, the content interface 125 may present additional digital content items for selection such as other digital content items in the playlist. The content interface 125 may use metadata of these other digital content items to display a title and a preview thumbnail, for instance. In addition to visible metadata, the content interface 125 may include other non-displayed metadata such as a canonical playlist.

To generate the canonical playlist metadata, the canonical mapping module 122 extracts the content identifier and the playlist identifier from a received URI. The canonical mapping module 122 verifies that the identified content belongs to the identified playlist, and determines whether the identified playlist is canonical. If the identified playlist is not canonical, or if the URI includes no playlist identifier, then the canonical mapping module 122 determines whether there is a canonical playlist corresponding to the content identifier based on the content's entry in the content store 128. If there is a canonical playlist for the content, the canonical mapping module 122 retrieves the canonical playlist identifier corresponding to the canonical playlist.

Using the canonical playlist identifier from the canonical mapping module 122, the URI generator 123 determines a canonical URI for inclusion in the metadata of the digital content item. The canonical URI may include the domain of the content server 120, the content identifier, and the canonical playlist identifier corresponding to the digital content item. If the canonical mapping module 122 determines that the digital content item does not belong to a canonical playlist, then the canonical URI for the digital content item omits a playlist identifier. Although URIs at the content server 120 may include parameters such as a time in a video to begin playback, the canonical URI generator 123 omits these parameters from canonical URIs, in one embodiment.

Based on the canonical URI for the digital content item, the metadata generator 124 generates one or more instances of metadata indicating the canonical URI. The generated metadata typically include the canonical URI and one or more signifiers indicating that the URI is a canonical URI. The generated canonical URI or playlist metadata may include one or more instances of metadata in a format used by the content server 120 as well as instances of metadata in a form recognized by various content distributors 130 and/or search engines 140.

In one embodiment, the metadata generator 124 creates metadata directing search engines not to index the requested URI if the playlist identifier does not match the canonical playlist identifier. For example, a metadata tag contains a "noindex" instruction for a search engine 140, which indicates that the example page should not be indexed. The example page may be de-indexed because the video content is non-public or because the playlist associated with the page is different from the canonical playlist associated with the video. Aside from de-indexing, the metadata generator 124 may insert other metadata to assist search engines 140 in recognizing playlists or removing duplicates. For example, the metadata generator 124 inserts a pointer to a previous or a next video in the playlist. As another example, the metadata generator 124 inserts cluster metadata to assist search engines 140 in grouping similar or duplicate content.

The web server 126 links the content server 120 via the network 150 to the client devices 110 as well as to the content distributor 130 and to the search engine 140. The web server 126 serves web pages, as well as other content, such as JAVA®, FLASH®, XML and so forth. The web server 126 may receive uploaded content items from the one or more client devices 110. Additionally, the web server 126 communicates instructions from the content interface 125 for viewing digital content and for processing received input from a user of a client device 110. Additionally, the web server 126 may provide application programming interface (API) functionality to send data directly to native client device operating systems, such as IOS®, ANDROID™, WEBOS® or BlackberryOS.

Canonical Playlist Metadata Generation

Figure 2:
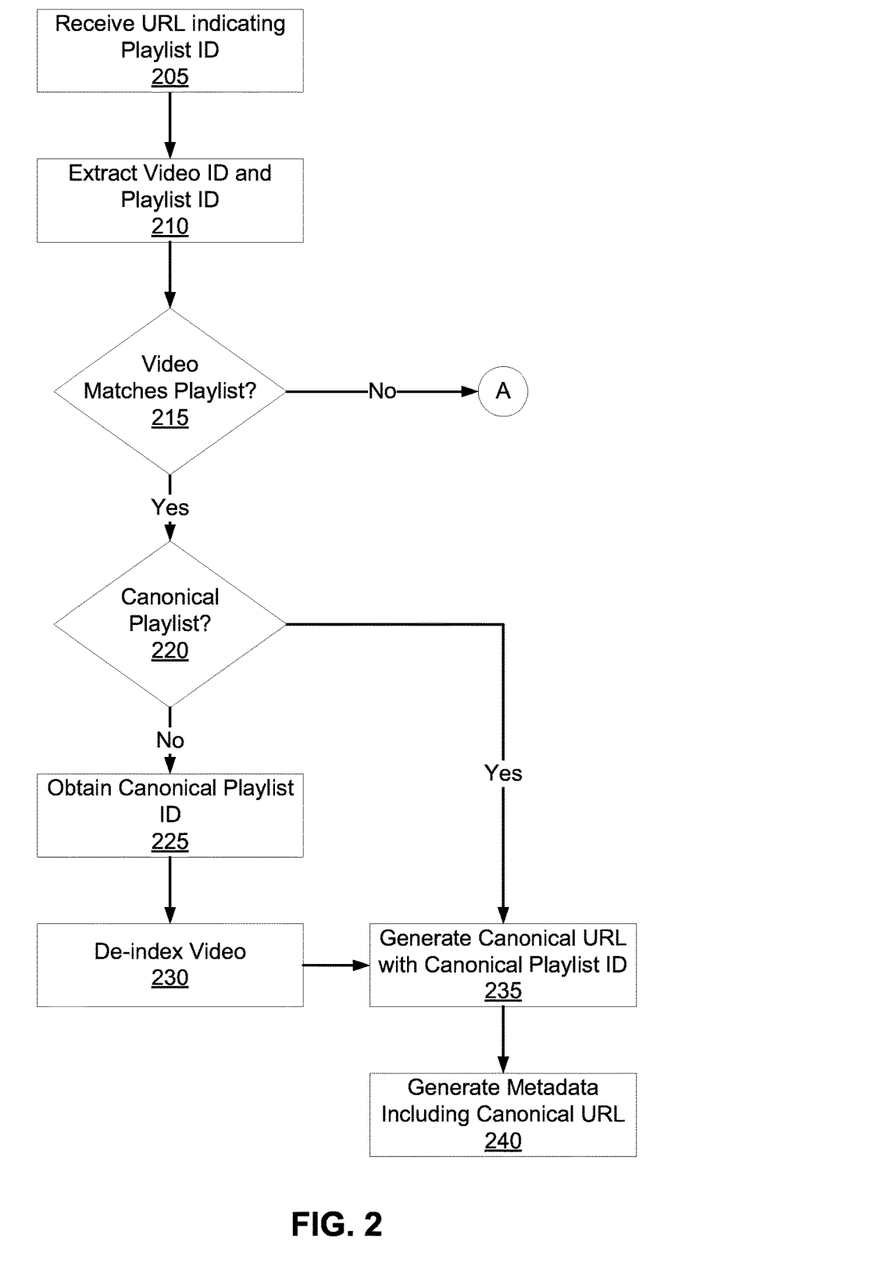
FIG. 2 and FIG. 3 illustrate flowcharts of an example process for generating metadata for digital content based on canonical playlists, in accordance with one embodiment.
Figure 3:
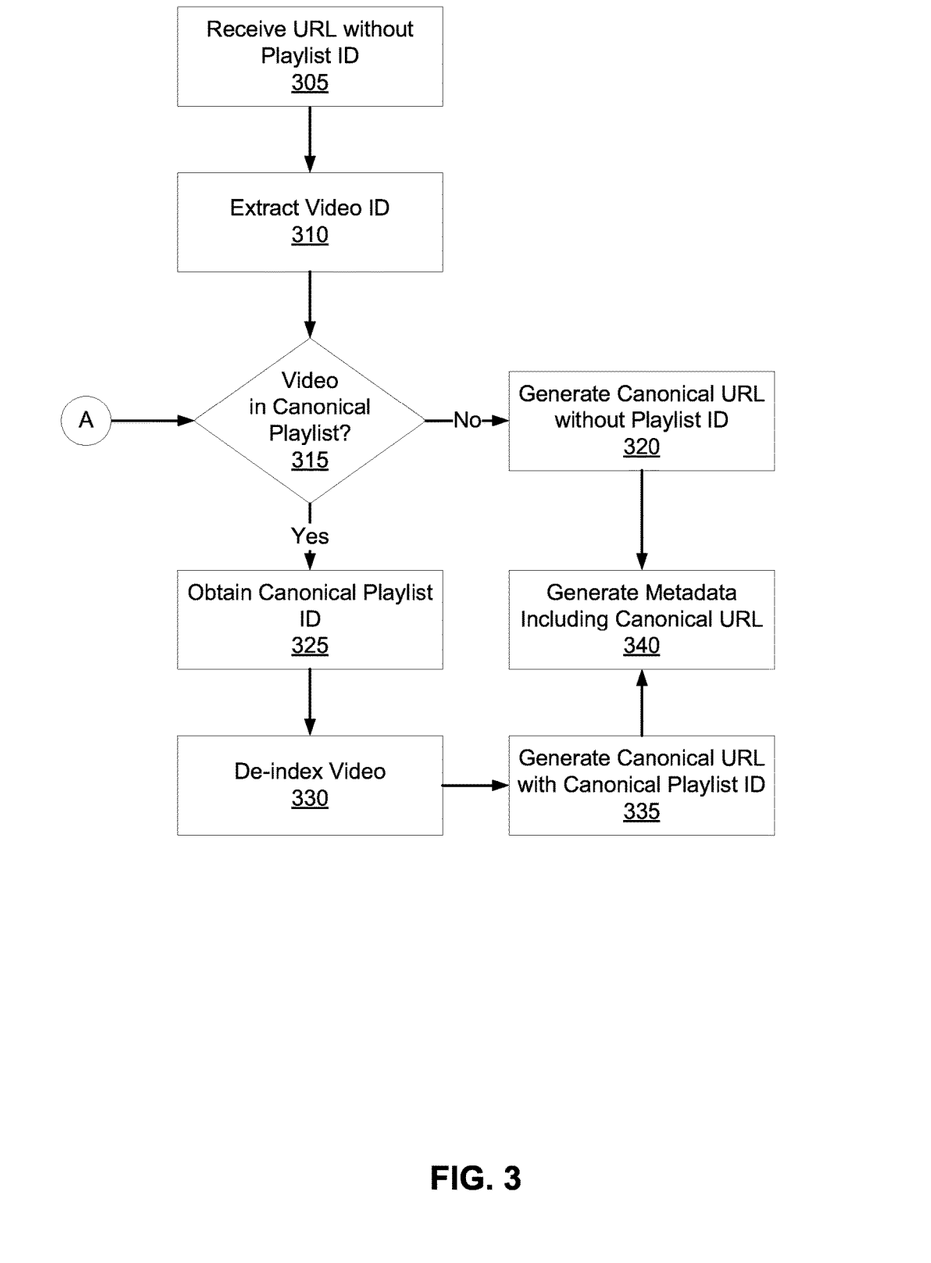

FIG. 2 and FIG. 3 illustrate flowcharts of an example process for generating metadata for digital content based on canonical playlists, in accordance with one embodiment. FIG. 2 illustrates the example process for URIs that indicate a playlist and FIG. 3 illustrates the example process for URIs that do not indicate a playlist but rather a video. In the illustrated embodiment, the digital content item is a video and the content identifier is a video identifier; however, the process described herein is fully applicable to other digital content such as audio files, images, animations, or text.

The content server 120 receives a request to access a video in a playlist at a URI. The content server 120 receives 205 the requested URI indicating a playlist through the web server 126. From the received URI, the canonical mapping module 122 extracts 210 a video identifier (ID) and a playlist identifier. The video and playlist identifier may be embedded as parameters in the URI. Alternatively or additionally, the URI may include a playlist identifier and an index of the playlist corresponding to the video. Based on the index and the playlist, the canonical mapping module 122 may retrieve the video identifier.

Based on the playlist identifier and the video identifier, the canonical mapping module 122 determines whether 215 the video belongs in the playlist based on data from the playlist store 129. If 215 the playlist does not match the video, then the canonical mapping module 122 ignores the playlist identifier and handles the URI as if it did not specify a playlist, as described in conjunction with FIG. 3 below. If 215 the video belongs to the requested playlist, then the module 122 determines whether 220 the identified playlist is a canonical playlist with respect to the identified video. If 220 the playlist is the video's canonical playlist, then the URI generator 123 generates 235 a canonical URI including the video identifier and the playlist identifier of the canonical playlist. Otherwise, the canonical mapping module 122 obtains 225 the canonical playlist identifier associated with the video from the content store 128.

Since the received URI indicates a video in a playlist different from the video's canonical playlist, the metadata generator 124 may optionally create one or more instances of metadata indicating to de-index 230 the received URI. When a search engine 140 encounters the de-index metadata, the search engine 140 does not index the playlist and video at the received URI. The URI generator 123 then generates 235 a canonical URI including the obtained canonical playlist identifier and the video identifier. Lastly, the metadata generator 124 generates 240 metadata including the canonical URI that indicates the canonical playlist and the video.

FIG. 3 illustrates the example process for URIs that include a video identifier but not a playlist identifier. The content server 120 receives a request to access a video at a URI. The content server 120 receives 305 the requested URI indicating a video through the web server 126. From the received URI, the canonical mapping module 122 extracts 310 a video identifier. The video identifier may be embedded as parameters in the URI. Alternatively, the content server 120 receives 205 a URI indicating a playlist and a video that does not belong in that playlist. In this case, the canonical mapping module 122 ignores the playlist identifier.

Based on the video identifier, the canonical mapping module 122 determines whether 315 the video belongs to a canonical playlist. If 315 the video does not belong to a canonical playlist, then the URI generator 123 generates 320 a canonical URI containing the video identifier but not the playlist identifier. Otherwise, the canonical mapping module 122 obtains 325 the canonical playlist identifier associated with the video from the content store 128.

Since the received URI indicates a video outside of the video's canonical playlist, the metadata generator 124 may optionally create one or more instances of metadata indicating to de-index 330 the received URI. The URI generator 123 then generates 335 a canonical URI including the obtained canonical playlist identifier and the video identifier. Lastly, the metadata generator 124 generates 340 metadata including the canonical URI from the URI generator 123. If the initially received URI includes a playlist and a video that does not belong to that playlist, then the web server 126 may additionally redirect the requesting client device 110 to access the generated canonical URI corresponding to the video.

Retrieving a Video in a Canonical Playlist

Figure 4:
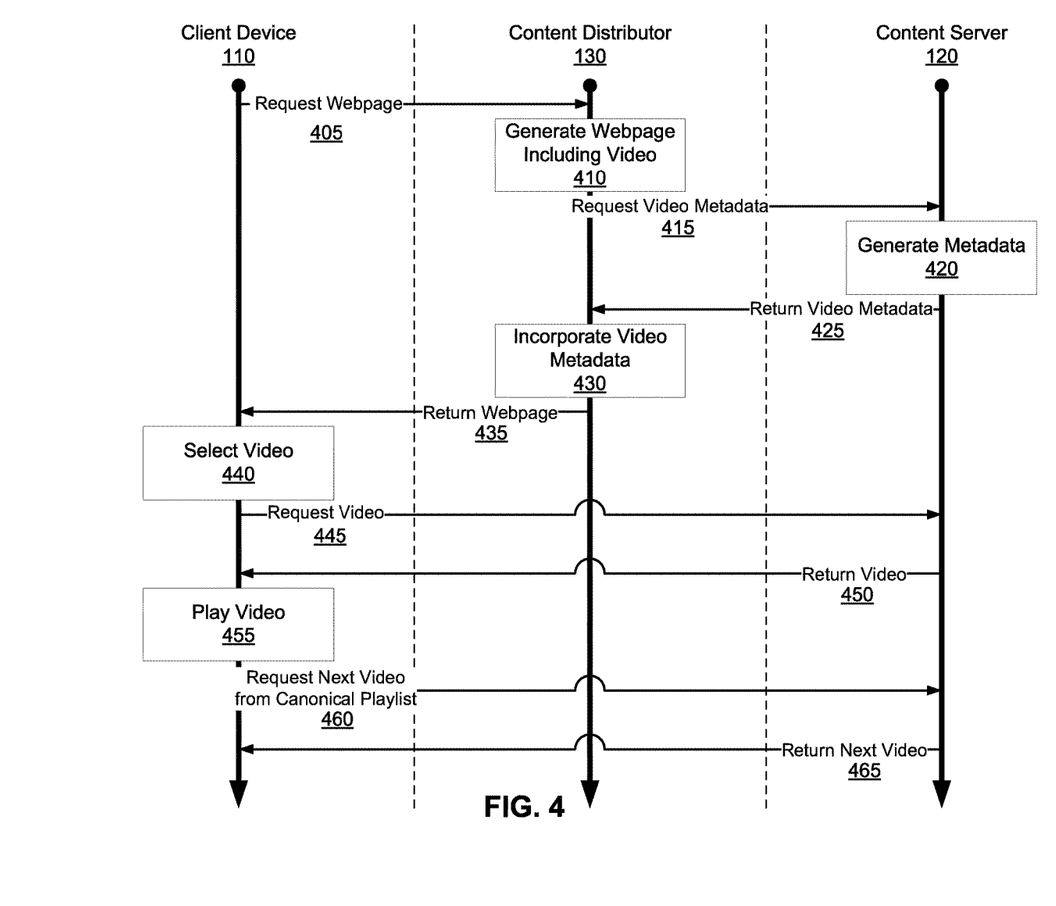
FIG. 4 illustrates example interactions between a client device, a content distributor, and the content server to retrieve a video in a canonical playlist, in accordance with one embodiment.

FIG. 4 illustrates example interactions between a client device 110, a content distributor 130, and the content server 120 to retrieve a video in a canonical playlist, in accordance with one embodiment. The interactions may be performed for a digital content item embedded in, shared through or otherwise included in a different digital publication than a webpage such as a personalized content stream or feed, a social network, or a publish-subscribe system.

A user requests 405, through the client device 110, a webpage including a video on the content server 120. In response, the content distributor 130 generates 410 the requested webpage including the video. Generating a webpage includes preparing a static page or preparing dynamic elements that are personalized for the user or that vary over time. To include the video in the webpage, the content distributor requests video metadata 415 from the content server 120. The content server 120 generates 420 metadata, as described above in conjunction with FIG. 2 and FIG. 3, for example. The returned 425 metadata may include a canonical URI indicating a canonical playlist for the generated video. The metadata may include other metadata associated with the canonical playlist such as a next video pointer to another video in the canonical playlist as well as a preview title, description, or thumbnail for the next video in the canonical playlist.

The content distributor 120 incorporates 430 the video metadata into the requested webpage, which is returned 435 to the client device 110. For example, the returned webpage includes a pointer to the video embedded in a video player, which also contains a pointer to the next video in the canonical playlist. The user of the client device 110 may then select 440 to play the video. The client device requests 445, using the pointer, the video from the content server 120, which returns 450 the video content (e.g., as a download or through a streaming protocol). After playing 455 the video, the client device 110 may automatically request 460 a next video from the canonical playlist based on the next video pointer in the video's metadata. The content server 120 returns 465 the next video in the canonical playlist as requested. In an alternative embodiment where the video player does not have an auto-play functionality, the video player may instead display video previews for selection after playing the video, where the displayed video previews correspond to other videos in the canonical playlist.

Even if the URI of the requested video corresponds to the video in a different playlist, the returned instances of metadata correspond to the canonical playlist rather than the non-canonical playlist. For example, suppose a posting user shares a video in a non-canonical playlist on a social networking website. If a friend of the posting user sees the video on the social networking website and plays it, the video will begin playing in its canonical playlist instead of its originally linked non-canonical playlist.

Indexing a Video in a Canonical Playlist

Figure 5:
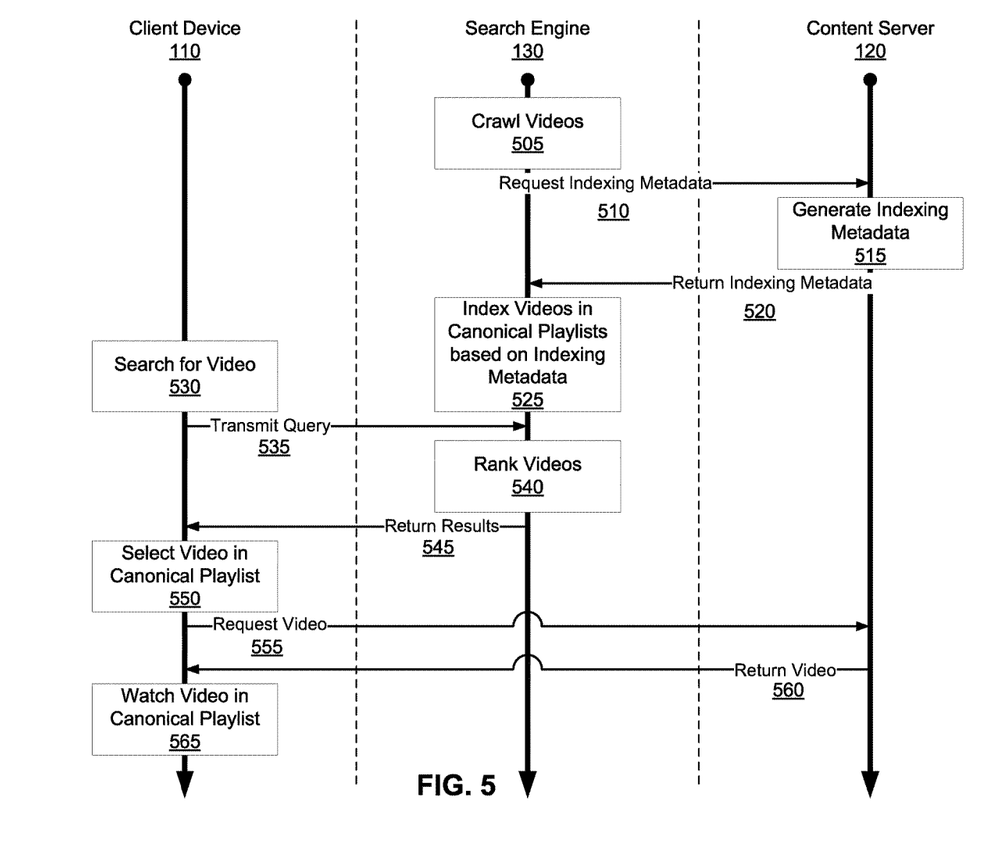
FIG. 5 illustrates example interactions between a client device, a search engine, and the content server to find a video in a canonical playlist, in accordance with one embodiment.

FIG. 5 illustrates example interactions between a client device 110, a search engine 140, and the content server 120 to find a video in a canonical playlist, in accordance with one embodiment. A search engine 130 crawls 505 videos on the content server 120 by traversing a site map, for example. For the various videos on the content server 120, the search engine 130 requests 510 indexing metadata, which the content server generates 515 and returns 520. To generate 515 the indexing metadata, the content server 120 may use a process similar to that described in conjunction with FIG. 2 and FIG. 3, for example. The content server 120 may have already generated the indexing metadata prior to the request from the search engine 130. The search engine 130 indexes 525 videos, including videos in canonical playlists, based on the returned indexing metadata. In one embodiment, non-public videos, non-public playlists, and videos in non-canonical playlists are associated with indexing metadata instructing the search engine 130 to omit them from the index. Additionally, videos that are part of a canonical playlist at URIs that do not include a playlist identifier may be associated with indexing metadata instructing the search engine 130 to omit them from the index.

Independently from the search engine 130 creating or updating the index, a user of the client device 110 searches 530 for a video and transmits 535 the search query to the search engine 130. Using the index, the search engine 130 ranks 540 videos based on relevance to the search query and returns 545 results including pointers to ranked videos to the client device 110. The ranked videos exclude video-playlist combinations with a no index element. The user of the client device 110 selects 550 a video in a canonical playlist and requests 555 the video from the content server 120. The user of the client device 110 may watch the video through the content interface 125 or through an embedded video player in the interface of the search engine 130, for example. The content server 120 returns 560 the video, and the user of the client device 110 watches 565 the video in its canonical playlist. If the user continues watching, the client device 110 may retrieve additional videos from the canonical playlist.

Redirecting to a Canonical Playlist

Figure 6:
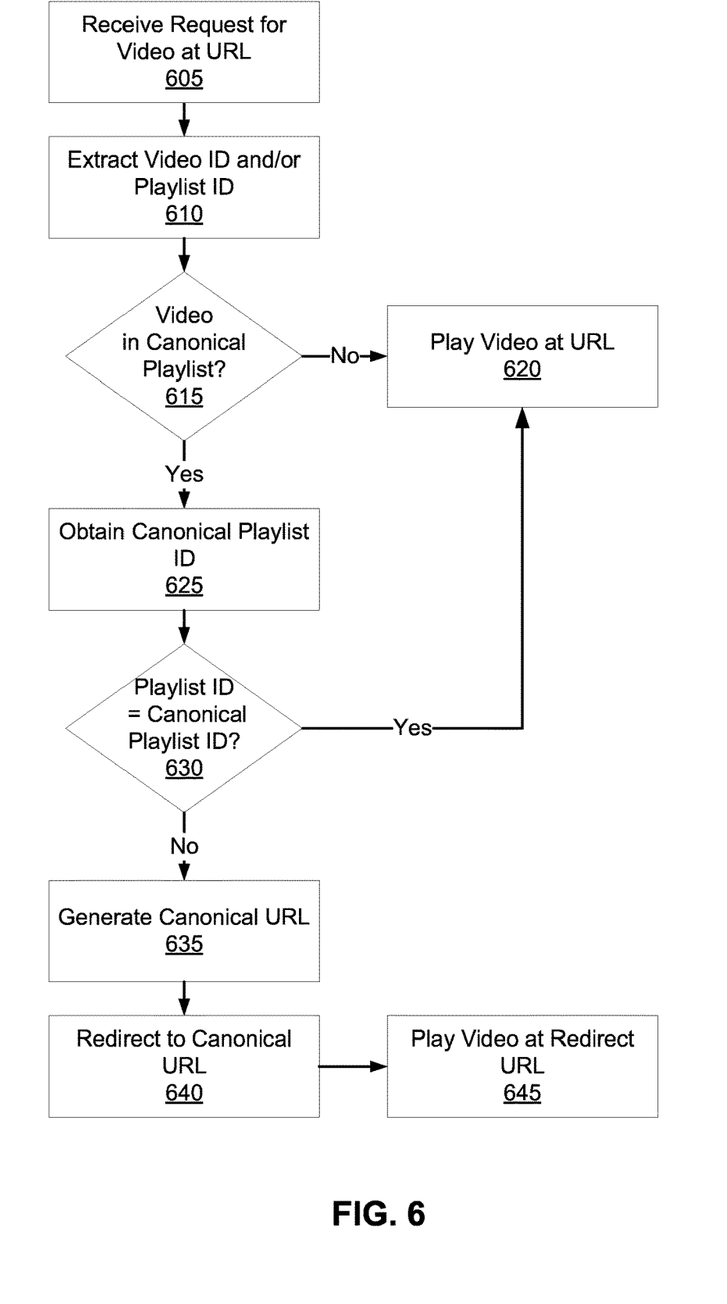
FIG. 6 illustrates a flowchart of an example process for redirecting content requests to a canonical playlist, in accordance with an alternative embodiment.

As an alternative to generating metadata that directs users to watch shared digital content in canonical playlists, the content server 120 may instead redirect videos from playing in non-canonical playlists. FIG. 6 illustrates a flowchart of an example process for redirecting content requests to a canonical playlist, in accordance with an alternative embodiment. The content server 120 receives 605 a URI through the web server 126. From the received URI, the canonical mapping module extracts 610 a video identifier and a playlist identifier. Based on the video identifier and/or the playlist identifier, the canonical mapping module 122 determines whether 615 the video is in a canonical playlist. If 615 the video is, then the module 122 obtains 625 the canonical playlist identifier from the content store 128. Otherwise, the content interface 125 begins playing 620 the requested video at the received URI, or the web server 126 streams or downloads the video to a requesting client 110. Thus, if a video is not in a canonical playlist, the video may still be played in various non-canonical playlists.

If 615 the video is associated with a canonical playlist, then the canonical mapping module 122 determines whether 630 the obtained canonical playlist identifier matches the extracted playlist identifier. If 630 they do match, the video is played 620, streamed, or downloaded through the received URI. If 630 the playlist identifier and canonical playlist identifier do not match, then the URI generator 123 generates 635 a canonical URI containing the obtained canonical playlist identifier and the video identifier. The web server 126 then redirects 640 the requesting client device 110 to the generated canonical URI. After following the redirect, the video plays 645 in its canonical playlist at the canonical URI; alternatively, the web server 126 streams or downloads the video to the client device 110.

Although described with respect to a direct interaction between a client device 110 and a content server 120, an alternative embodiment with redirects to canonical URIs may additionally be implemented for requests to view a video at an content distributor 130 (e.g., through an embedded video player). When the video player at the content distributor 130 requests a video in a non-canonical playlist, the content server 120 redirects the video player to retrieve the video from a canonical URI so that the video plays in its canonical playlist.

Computer System

Figure 7:
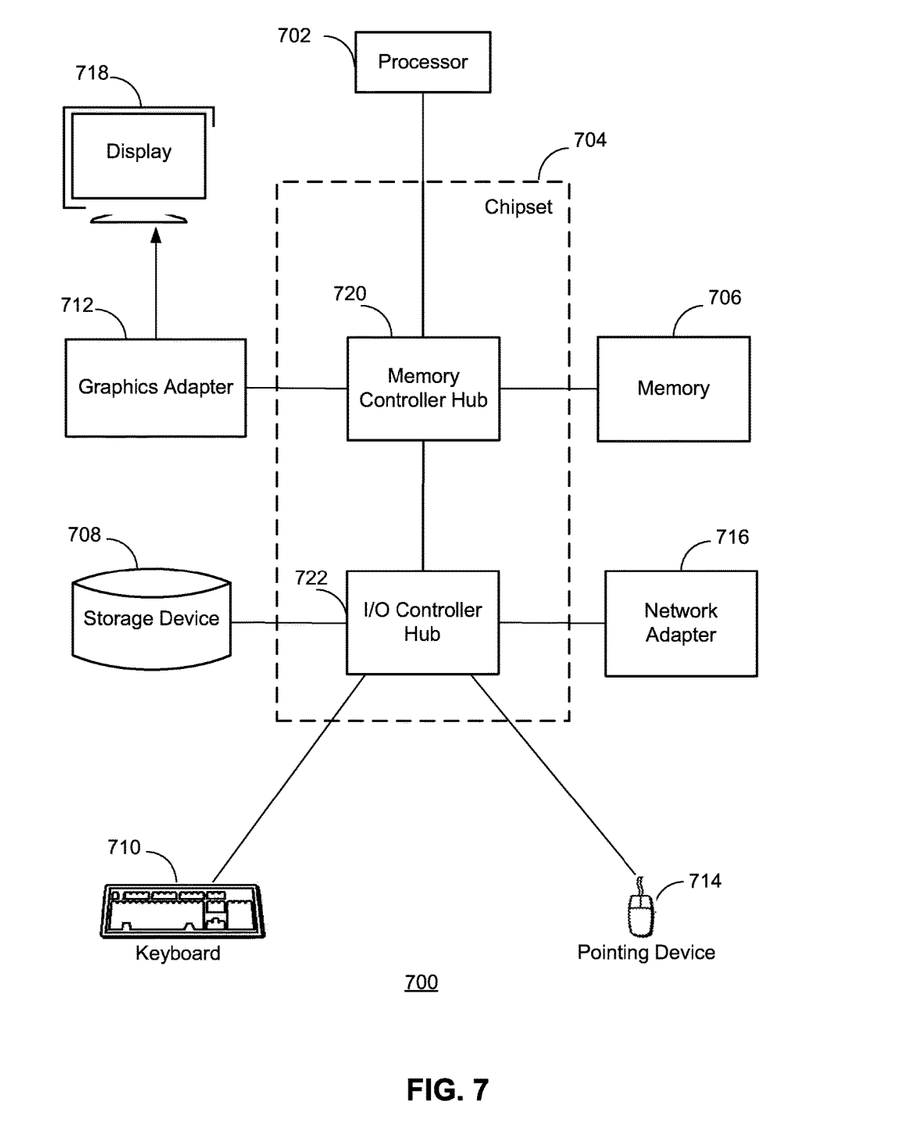
FIG. 7 is a high-level block diagram illustrating an example computer usable to implement entities of the content sharing environment, in accordance with one embodiment.

The client device 110, the content server 120, the content distributor 130, and the search engine 140 may be implemented using one or more computers. FIG. 7 is a high-level block diagram illustrating an example computer 700 usable to implement entities of the content sharing environment, in accordance with one embodiment.

The computer 700 includes at least one processor 702 (e.g., a central processing unit, a graphics processing unit) coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The processor 702 may include one or more processors 702 having one or more cores that execute instructions. The pointing device 714 is a mouse, track ball, or other type of pointing device, and is used in combination with the keyboard 710 to input data into the computer 700. The graphics adapter 712 displays digital content and other images and information on the display 718. The network adapter 716 couples the computer 700 to one or more computer networks (e.g., network 150).

The computer 700 is adapted to execute computer program modules for providing functionality described herein including presenting digital content, playlist lookup, and/or metadata generation. As used herein, the term "module" refers to computer program logic used to provide the specified functionality. Thus, a module can be implemented in hardware, firmware, and/or software. In one embodiment of a computer 700 that implements the content server 120, program modules such as the canonical mapping module 122, the URI generator 123, and the metadata generator 124 are stored on the storage device 708, loaded into the memory 706, and executed by the processor 702.

The types of computers 700 used by the entities of the content sharing environment can vary depending upon the embodiment and the processing power required by the entity. For example, the content server 120 might comprise multiple blade servers working together to provide the functionality described herein. The computers 700 may contain duplicates of some components or may lack some of the components described above (e.g., a keyboard 710, a graphics adapter 712, a pointing device 714, a display 718). For example, the content server 120 run in a single computer 700 or multiple computers 700 communicating with each other through a network such as in a server farm.

Additional Considerations

Although the foregoing description has focused primarily on videos for purposes of providing a concrete illustration, various embodiments may incorporate different types of digital content in different forms of playlists. In one embodiment, the content server 120 contains audio files in playlists, which may be presented through an audio player instead of a video player. It should be noted that videos may contain audio files as well. As another embodiment, the content server 120 contains images and/or animations organized in albums instead of playlists. Rather than using a video or an audio player, these images and/or animations may be presented in a slideshow, which may contain auto-play functionality (e.g., the slideshow retrieves a next image or animation after a period of time). In yet another embodiment, the digital content includes text, which may be organized into textual collections (e.g., chapters in a book, installments in a short story series, poems in an anthology). Digital content may include combinations of video, audio, images, animations, and/or text.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. To implement these operations, the content server 120 may use a non-transitory computer-readable medium that stores the operations as instructions executable by one or more processors. Any of the operations, processes, or steps described herein may be performed using one or more processors. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Additional alternative structural and functional designs may be implemented for a system and a process for a content sharing environment. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

What is claimed is:

1. A computer-implemented method comprising:
designating, by at least one processor of a content server, a first playlist in a playlist store as a canonical playlist with respect to a video;
receiving, by the at least one processor of the content server from a client device of a user, a request to share the video with one or more contacts of the user on a social networking platform;
determining, by the at least one processor based on the playlist store of the content server, that the video is included in two or more playlists, each of the two or more playlists comprising one or more videos;
determining that the first playlist of the two or more playlists in the playlist store is designated as the canonical playlist with respect to the video, wherein no other playlist in the playlist store of the content server is designated as the canonical playlist with respect to the video;
generating, by the at least one processor of the content server, a canonical universal resource identifier (URI)

for the video, the canonical URI including a canonical playlist identifier specifying the determined canonical playlist and comprising a video identifier of the video; and causing the video in the determined playlist to be shared with the video is updated to include the canonical URI, wherein when a search engine requests the metadata associated with the video specified by the canonical URI, the metadata associated with the video specified by the canonical URI indicates to index the canonical URI for inclusion in search results; and wherein when the search engine requests metadata associated with the video specified by a non-canonical URI, the metadata associated with the video specified by the non-canonical URI indicates not to index the non-canonical URI for inclusion in the search results.

2. The method of claim 1, further comprising:

receiving, from one or more client devices of the one or more contacts, one or more requests to view the video; and responsive to the one or more requests, sending, to the one or more client devices, the video for viewing and a next video reference comprising at least one of the canonical playlist identifier and an identifier of an additional video included in the canonical playlist.

3. The method of claim 1, further comprising:

receiving, from a content distributor, a request for metadata associated with the video; and responsive to the request, sending, to the content distributor, the metadata associated with a user interface, the metadata comprising the canonical URI in a form acceptable to the content distributor.

4. The method of claim 1, wherein the request to share comprises a request to share the video in a playlist specified by a playlist identifier.

5. The method of claim 4, wherein determining that the first playlist of the two or more playlists is the canonical playlist with respect to the video comprises:

determining whether the specified playlist includes the video; and responsive to determining that the specified playlist does not include the video, retrieving the first playlist that is designated as the canonical playlist including the video.

6. The method of claim 4, wherein determining that the first playlist of the two or more playlists is the canonical playlist with respect to the video comprises:

obtaining one or more properties associated with the specified playlist and the video, the one or more properties selected from the group consisting of: a temporary property, a private property, and an unlisted property;

based on the obtained one or more properties, determining whether the video is eligible for inclusion in one canonical playlist; and responsive to determining that the specified grouping is eligible for inclusion in one canonical playlist, retrieving the first playlist that is designated as the canonical playlist including the video.

7. The method of claim 4, wherein the playlist identifier specifies a different playlist than the canonical playlist.

8. The method of claim 7, further comprising:

incorporating an indicator that indicates not to index the non-canonical URI specifying the different playlist into the metadata associated with a user interface;

receiving, from the search engine, a request for the metadata associated with the video specified by the non-canonical URI; and sending, to the search engine, the metadata comprising the indicator that indicates not to index the non-canonical URI.

9. The method of claim 8, wherein the non-canonical URI was generated expressly for sharing the video.

10. The method of claim 1, wherein the two or more playlists comprises one or more playlists that are not designated as canonical playlists with respect to any video.

11. The method of claim 1, wherein the metadata further includes one or more signifiers indicating that the canonical URI includes the canonical playlist identifier.

12. The method of claim 1, wherein the canonical playlist includes a particular ordering of at least one video in relation to at least another video in the canonical playlist.

13. The method of claim 1, wherein second canonical playlist identifies a particular ordering of at least one video indicating a successive video in the canonical playlist.

14. A computer-implemented method comprising:

designating, by at least one processor of a content server, a first playlist in a playlist store as a canonical playlist with respect to a video;

receiving, by the at least one processor of the content server from a client device of a user, a request to share the video with one or more contacts of the user on a social networking platform in a playlist specified by a playlist identifier;

determining, by the at least one processor based on the playlist store of the content server, that the video is included in two or more playlists, each of the two or more playlists comprising one or more videos;

determining that the first playlist of the two or more playlists in the playlist store is designated as the canonical playlist with respect to the video, wherein no other playlist in the playlist store of the content server is designated as the canonical playlist with respect to the video;

generating, by the at least one processor of the content server, a canonical universal resource identifier (URI) for the video, the canonical URI including a canonical playlist identifier specifying the designated canonical playlist and comprising the video identifier; and responsive to the one or more contacts initiating requests to play the video upon sharing of the video on the social networking platform, redirecting one or more client devices of the one or more contacts of the user to view the video with the canonical playlist based on the canonical URI; wherein metadata associated with the video is updated to include the canonical URI, wherein when a search engine requests the metadata associated with the video specified by the canonical URI, the metadata associated with the video specified by the canonical URI indicates to index the canonical URI for inclusion in search results; and wherein when the search engine requests metadata associated with the video specified by a non-canonical URI, the metadata associated with the video specified by the non-canonical URI indicates not to index the non-canonical URI for inclusion in the search results.

15. The method of claim 14, further comprising:

receiving, from the one or more client devices, one or more requests to view the video; and responsive to the one or more requests, sending, to the one or more client devices, the video for viewing and a next video reference comprising at least one of the canonical playlist identifier and an identifier of an additional video included in the canonical playlist.

16. The method of claim 14, further comprising:
receiving, from an content distributor, a request for the metadata associated with the video; and
responsive to the request, sending, to the content distributor, the metadata associated with the video specified by the canonical URI.

17. The method of claim 14, wherein determining that the first playlist of the two or more playlists is designated as the canonical playlist with respect to the video comprises:
determining whether the specified playlist includes the video; and
responsive to determining that the specified playlist does not include the specified video, retrieving the first playlist that is designated as the canonical playlist including the video.

18. The method of claim 14, wherein determining that the first playlist of the two or more playlists is designated as the canonical playlist comprises:
obtaining one or more properties associated with the specified playlist and the video, the one or more properties selected from the group consisting of: a temporary property, a private property, and an unlisted property;
based on the one or more obtained properties, determining whether the video is eligible for inclusion in one canonical playlist; and
responsive to determining that the specified grouping is eligible for inclusion in one canonical playlist, retrieving the first playlist that is designated as the canonical playlist including the video.

\* \* \* \* \*